(12) United States Patent
Jang et al.

(10) Patent No.: US 7,739,491 B2
(45) Date of Patent: Jun. 15, 2010

(54) METHOD USING ACCESS AUTHORIZATION DIFFERENTIATION IN WIRELESS ACCESS NETWORK AND SECURE ROAMING METHOD THEREOF

(75) Inventors: Kyung-hun Jang, Kyungki-do (KR); In-sun Lee, Seoul (KR); Jong-ae Park, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 10/607,917

(22) Filed: Jun. 26, 2003

(65) Prior Publication Data
US 2004/0005057 A1 Jan. 8, 2004

(30) Foreign Application Priority Data
Jul. 5, 2002 (KR) .................... 10-2002-0038882

(51) Int. Cl.
*H04L 29/06* (2006.01)
*H04W 36/00* (2009.01)
(52) U.S. Cl. ....................... 713/150; 455/439
(58) Field of Classification Search .................. None
See application file for complete search history.

(56) References Cited

U.S. PATENT DOCUMENTS

| 6,289,102 B1 * | 9/2001 | Ueda et al. | 380/201 |
|---|---|---|---|
| 7,072,657 B2 * | 7/2006 | Watanabe et al. | 455/439 |
| 7,221,764 B2 * | 5/2007 | Cohen et al. | 380/278 |
| 7,275,157 B2 * | 9/2007 | Cam Winget | 713/168 |
| 2002/0108040 A1 * | 8/2002 | Eskicioglu | 713/172 |

FOREIGN PATENT DOCUMENTS

| EP | 1 111 952 | 6/2001 |
|---|---|---|
| JP | 2002/108819 | 4/2002 |
| JP | 2002-124952 | 4/2002 |
| JP | 2004-015210 | 1/2004 |

(Continued)

OTHER PUBLICATIONS

European Search Report dated Dec. 29, 2003 issued in a counterpart application, namely, Appln. No. 03254271.4.

(Continued)

*Primary Examiner*—Brandon S Hoffman
(74) *Attorney, Agent, or Firm*—NSIP Law

(57) ABSTRACT

An encryption key distribution method capable of performing fast roaming by differentially distributing encryption keys in advance, according to access authorization classes, in a wireless access network and a roaming method using distributed encryption keys are provided. The encryption key distribution method comprises: receiving a command to communicate with an access point not available for communication using an encryption key currently selected in the encryption key set; determining access authorization of the access point not available for communications; selecting an encryption key from the encryption key set obtained in advance corresponding to the determined access authorization; and using the selected encryption key to encrypt a transmission message and communicate with the access point not available for communication. The method reduces the delay time, which is caused by encryption key distribution while a wireless terminal is traveling, such that roaming and a hand-off are carried out quickly and safely, and user convenience and safe transmission of data are achieved.

19 Claims, 5 Drawing Sheets

FOREIGN PATENT DOCUMENTS

| | | |
|---|---|---|
| JP | 2004-015211 | 1/2004 |
| JP | 2004-032664 | 1/2004 |
| WO | WO 00/41427 | 7/2000 |
| WO | WO 00/76120 | 12/2000 |
| WO | WO 00/76194 | 12/2000 |
| WO | WO 02/30132 | 4/2002 |

OTHER PUBLICATIONS

Wang et al., "Policy-Enabled Handoffs Across Heterogeneous Wireless Networks", 1999 IEEE, pp. 51-60.

* cited by examiner

METHOD USING ACCESS AUTHORIZATION DIFFERENTIATION IN WIRELESS ACCESS NETWORK AND SECURE ROAMING METHOD THEREOF

This application claims priority from Korean Patent Application No. 2002-38882, filed on Jul. 5, 2002, in the Korean Intellectual Property Office, the disclosure of which is incorporated herein by reference in its entirety.

BACKGROUND OF THE INVENTION

1. Field of the Invention

The present invention relates to a method for distributing encryption keys in a wireless network, and more particularly, to an encryption key distribution method capable of performing fast roaming by differentially distributing encryption keys in advance, according to access authorization classes in a wireless access network and a roaming method using distributed encryption keys.

2. Description of the Related Art

In a wireless network, to guarantee confidentiality of data and user authentication, data is encrypted prior to transmission. For encryption, an encryption key is needed. At present, an encryption key is shared between a wireless station (STA) and an access point (AP) in advance of access.

However, the number of wireless local area network (LAN) users is continuously increasing. But the time required for exchanging encryption keys during roaming or a hand-off is too long. This is due primarily to the method of sharing encryption keys at the roaming time. Accordingly, when the mobile characteristic of the wireless LAN is considered, the existing encryption key exchange method causes inconvenience to users.

Therefore, it is desirable that the delay time caused by exchanging encryption keys during roaming or hand-off is minimized. To this end, it is desirable that encryption keys are differentiated according to access authorization classes based on the attributes of users.

In a wireless access network, in order to perform encryption in a wireless link, STAs share encryption keys with APs. When a STA is roaming between APs or a hand-off occurs, the STA initiates a process for obtaining from the APs a shared key used for encryption. At this time, the biggest problem against fast secure roaming of the STA is the delay time caused by exchanging encryption keys.

In the prior art, in a wireless network formed of a wide area network (WAN), LANs, APs, and STAs, all STAs connected to one AP use an identical encryption key. Accordingly, when a STA is trying to access another AP included in the same LAN or another LAN the STA should use another encryption key. Also, whenever there is roaming or a hand-off, the STA should receive another corresponding encryption key.

Accordingly, in existing methods, whenever an STA is roaming or there is a hand-off between APs, the STA must initiate the process of obtaining from the AP an encryption key. Therefore, it is difficult to perform fast secure roaming when an STA is in motion.

SUMMARY OF THE INVENTION

The present invention provides a method by which various encryption keys are used for different access authorization types when the access authorization of an access point (AP) is set in advance. The various keys are obtained in advance by a wireless station (STA) so that fast secure roaming is performed and delay caused by exchanging encryption keys is minimized.

According to an aspect of the present invention, there is provided a method for allocating encryption keys according to access authorization classes, wherein an access authorization to an access point is set in advance, encryption keys are differentiated according to access authorization types, and the wireless station obtains the differentiated encryption keys in advance.

According to another aspect of the present invention, there is provided a method for allocating encryption keys according to access authorization classes, comprising:

(a) a wireless station sending an authentication request to an access point and the access point, which is requested to perform authentication, determining the access authorization to the access point;

(b) according to the determination result, obtaining an encryption key and generating a shared key set including the obtained encryption keys;

(c) the wireless station requesting a LAN authentication server to perform authentication, and the LAN authentication server, which is requested to perform authentication, determining the access authorization to an access point belonging to the LAN;

(d) according to the determination result, obtaining an encryption key and updating the shared key set by adding the encryption key to the shared key set;

(e) the wireless station requesting a WAN authentication server to perform authentication and the WAN authentication server, which is requested to perform authentication, determining the access authorization to an access point belonging to the WAN; and (f) according to the determination result, obtaining an encryption key and updating the shared key set by adding the encryption key to the shared key set.

According to still another aspect of the present invention, there is provided a roaming method for a wireless station using encryption keys allocated according to access authorization classes, comprising:

(a) setting an access authorization to an access point in advance, differentiating encryption keys according to the access authorization type, and a wireless station obtaining in advance an encryption key set, including the differentiated encryption keys for respective access points;

(b) receiving a command to communicate with an access point not available for communication using the encryption key currently selected in the encryption key set;

(c) determining the access authorization of the access point which is not available for communication;

(d) selecting an encryption key from the encryption key set corresponding to the determined access authorization; and (e) by using the selected encryption key, encrypting a transmission message and communicating with the access point which was not available for communication.

According to yet still another aspect of the present invention, there is provided a computer readable medium having embodied thereon a computer program for the methods.

According to a further aspect of the present invention, there is provided an apparatus for allocating encryption keys according to access authorization classes, comprising:

an access authorization determining unit which determines the access authorization class for communication between a wireless station and an access point;

an encryption key storing unit which stores encryption keys according to classes in advance; and an encryption key allocation unit which reads from the encryption key storing unit an encryption key corresponding to the determination result of the access authorization determining unit, and transfers the value to the wireless station.

According to an additional aspect of the present invention, there is provided a computer readable medium having embodied thereon the structure of a wireless data packet, which is used in a wireless network comprising a wireless station and an access point. The wireless data packet structure for allocating encryption keys is set according to access authorization classes, comprising:

a data packet header which is transmitted through the wireless network; an access authorization information storing field which indicates the access authorization for communication between the wireless station and the access point;

an encrypted data field in which data contents to be transmitted are encrypted and stored; and an error correction field, which is used to correct data error.

BRIEF DESCRIPTION OF THE DRAWINGS

The above objects and advantages of the present invention will become more apparent by describing in detail, preferred embodiments thereof with reference to the attached drawings in which.

DESCRIPTION OF THE PREFERRED EMBODIMENTS

Figure 1:
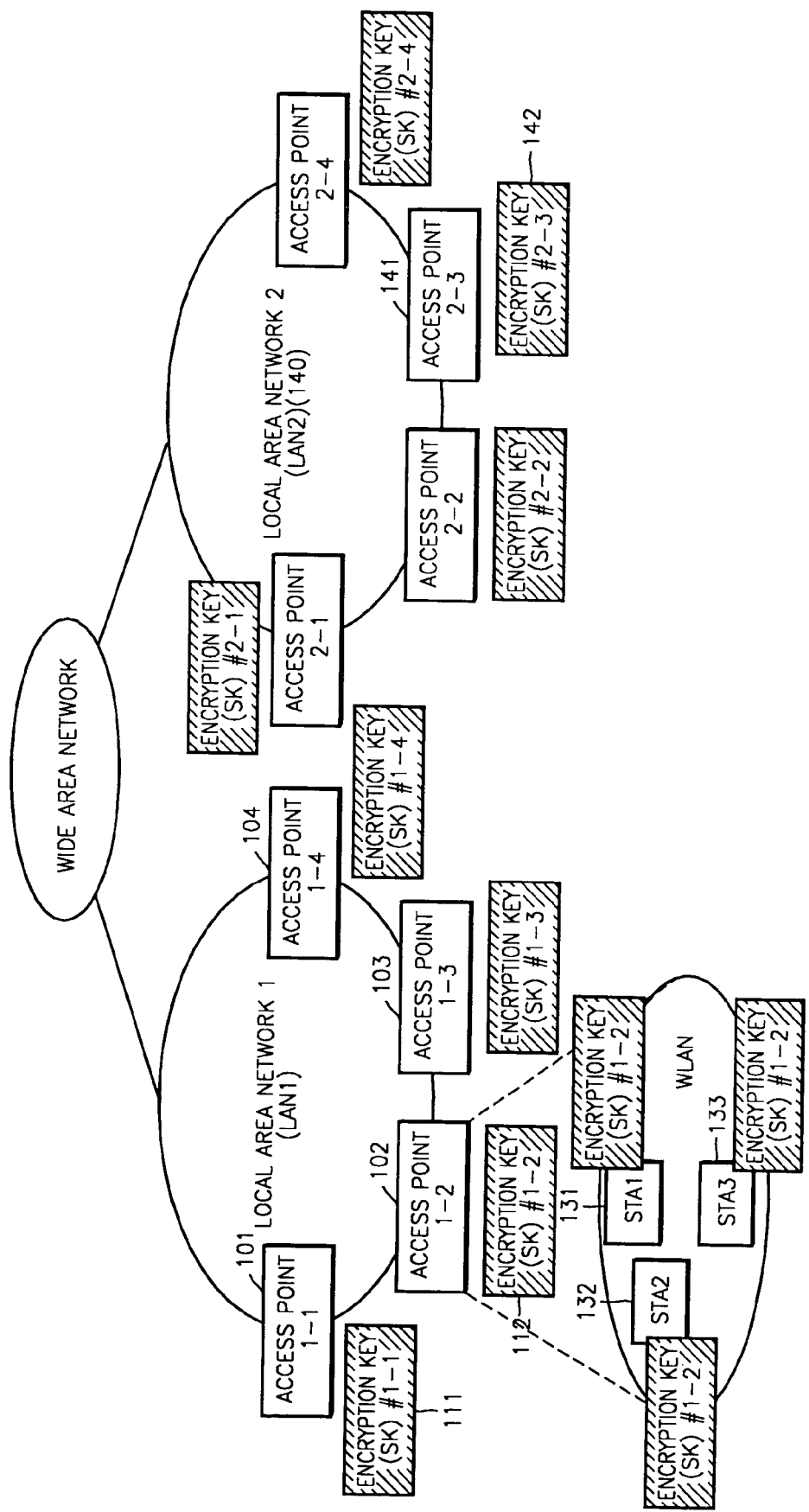
FIG. 1 is a diagram showing a prior art method for using an ordinary encryption key.

In FIG. 1, a wireless network is formed of a WAN, LANs, access points (APs), and wireless stations (STAs). The WAN is a geographically dispersed telecommunications network used to indicate a telecommunications structure covering a wider area than that of a LAN. In general, while the coverage of a LAN may be limited to one building, a part of a school, a laboratory, or a production plant, a WAN is a communications network connecting distant areas that may be separated geographically, such as a nation with another nation, or a continent with another continent.

As shown in FIG. 1, STAs 131, 132, and 133 connected to an AP 102 use an identical encryption key. Other APs 101, 103, and 104 require different encryption keys, therefore STAs 131, 132, and 133 connected to another AP 101, 103, and 104 must use another identical encryption key. For example, STAs 131, 132, and 133 connected to AP 101 must use encryption key #1-1 111, and an STAs 131, 132, and 133 connected to AP 102 must use encryption key #1-2 112. Accordingly, STA1 131, STA2 132, and STA3 133 all use encryption key #1-2 112 to access AP 102.

An STA must use a unique encryption key when that STA is connected to a unique AP on the same LAN or to an AP on another LAN. Therefore, whenever roaming or a hand-off is performed, the STA should receive an encryption key corresponding to the AP to which the STA is connected. For example, in order to communicate with AP 141 on LAN2 140, the STA1 131 requires a new encryption key #2-3 142 instead of its current encryption key #1-2 112.

Figure 2:
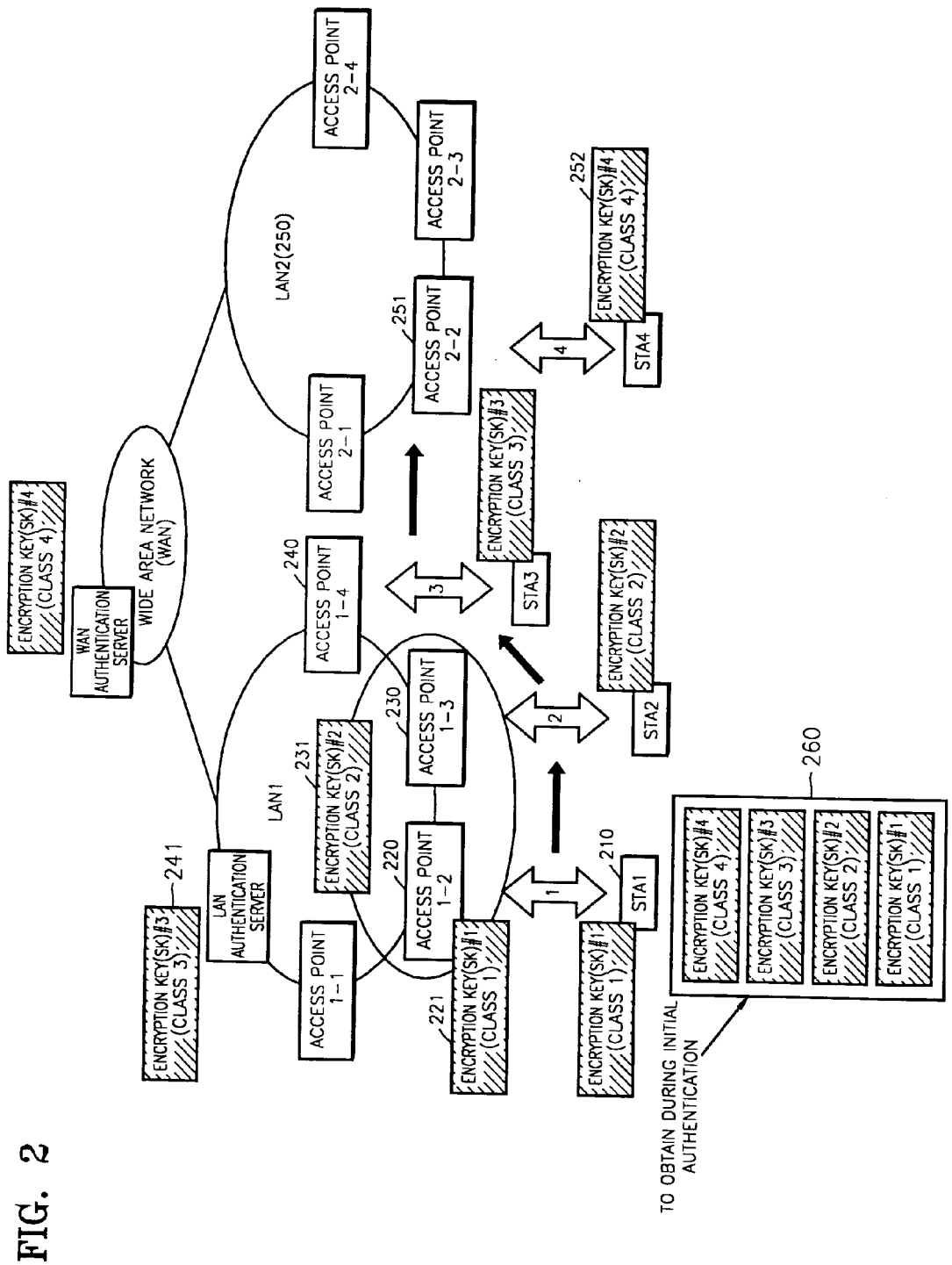
FIG. 2 is a diagram showing a method for using an encryption key according to the present invention.

FIG. 2 illustrates a method for using an encryption key of the present invention. To use a classified encryption key suggested in the present invention, there should be access to authorization classes. Encryption keys are classified into four classes as follows:

class 1 indicates access authorization to an AP to which an STA belongs, class 2 indicates access authorization to predetermined APs of a LAN to which an STA belongs, class 3 indicates access authorization to all APs of a LAN to which an STA belongs, and class 4 indicates access authorization to multiple APs of the WAN.

When initial authentication is performed, an STA obtains all allowed encryption keys. For example, STA1 210 requires class 1 encryption key #1 221 in order to communicate with AP1-2 220, class 2 encryption key #2 231 in order to communicate with AP1-3 230, class 3 encryption key #3 241 in order to communicate with AP1-4 240, and class 4 encryption key #4 252 in order to communicate with AP2-2 251 from another LAN, LAN2 250.

Accordingly, the STA1 210 obtains a set of encryption keys #1 through #4 260.

Preferably, classes have priorities. For informational access authorization, priorities are set in the order of class 1>class 2>class 3>class 4, while for the authorization to use a network, priorities are set in the order of class 1<class 2<class 3<class 4. The informational access authorization determines which class STA can use the requested AP first, to prioritize a plurality of STAs attempting to access the AP at the same time. The authorization to use a network is interpreted as an authorization to use a network more than others. That is, class 4 indicates that an STA can communicate with all APs and has a higher authorization to use the network. Encryption keys are differentiated according to classes, and encryption keys corresponding to the classes of an STA are allocated to the STA in advance when initial authentication of the STA is performed.

When an STA is switching from one AP to another AP or from an AP on one LAN to an AP on another LAN, the STA selects one of the encryption keys in the shared key set, which is allocated when the STA begins first roaming, and performs encryption. In this manner, the STA can reduce delay time caused by encryption key exchange.

Figure 3:
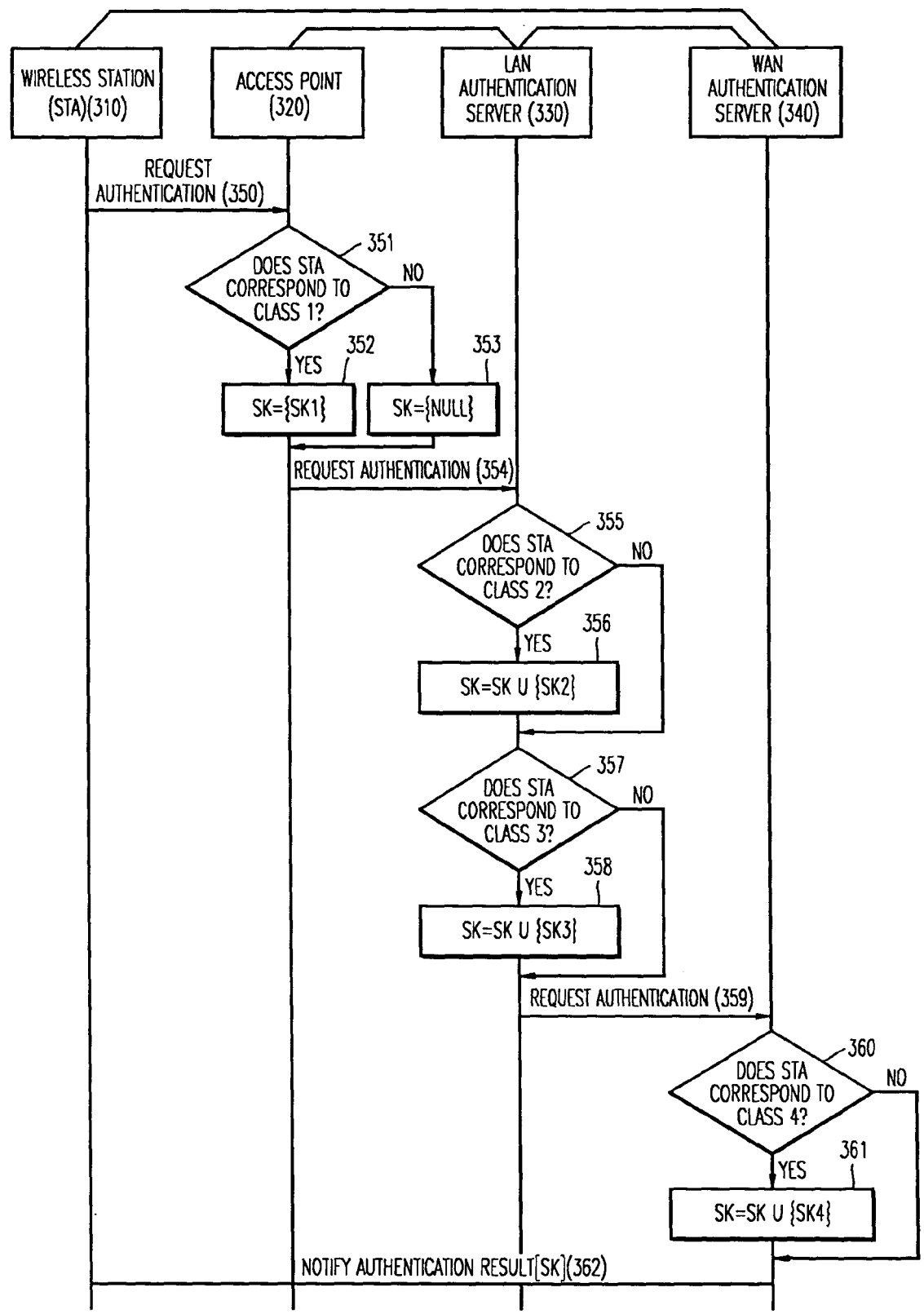
FIG. 3 is a flowchart showing method steps for allocating encryption keys during initial authentication of the present invention.

FIG. 3 is a flowchart illustrating a method for allocating encryption keys during initial authentication including a method for differentiating encryption keys according to access authorization classes in a wireless access network of the present invention. To allocate encryption keys according to the classes in a wireless network formed of a WAN, LANs and APs, a STA 310 communicates directly with an AP 320 by requesting authentication in step 350. An encryption key set shared by the STA 310 and AP 320 is referred to as a shared key set (SK).

The AP 320 follows the following authentication procedure. When authentication begins, the AP 320 determines whether or not the STA 310 corresponds to class 1 in step 351. If the STA 310 corresponds to class 1, the AP 320 generates a shared key SK={SK1} in step 352, or sets SK={null} in step 353 if no correspondence to class 1 is found. Then, the AP 320 sends an authentication request to a LAN authentication server 330 in step 354.

The LAN authentication server 330 determines whether or not the STA 310 corresponds to class 2 in step 355. If the STA 310 corresponds to class 2, the LAN authentication server 330 generates a new shared key SK2 and by combining it with the existing shared key SK, forms a new shared key set SK=SKU{SK2} in step 356. If STA 310 does not correspond to class 2, step 356 is skipped and processing continues in the decision step 357. Then, in step 357 LAN authentication server 330 determines whether or not the STA 310 corresponds to class 3. If the STA 310 corresponds to class 3, the LAN authentication server 330 generates a new shared key SK3 and forms a new shared key set SK=SKU{SK3} in step 358. If the existing shared key SK={null} in step 355, the LAN authentication server 330 first generates SK={SK2} and then forms SK={SK2}U{SK3}. If STA 310 does not correspond to class 3, step 358 is skipped.

Next, the STA 310 sends an authentication request to a WAN authentication server 340 in step 359. In step the WAN authentication server 340 determines whether or not the STA 310 corresponds to class 4. If the STA 310 corresponds to class 4, the WAN authentication server 340 adds a shared key SK4 to the shared key set SK transmitted by the LAN authentication server 330. By doing so, the WAN authentication server 340 generates a new shared key set SK=SKU{SK4} in step 361, finishes the authentication, and transmits the shared key set SK to the STA 310 in step 362. If STA 310 does not correspond to class 4, step 361 is skipped and processing restarts in step 362. If the WAN authentication server 340 does not authenticate the STA 310, it transmits the shared key set SK, provided by the LAN authentication server 330, to the STA 310 and finishes the authentication. If the shared key set SK is SK={null} at that time, the authentication is refused.

Figure 4:
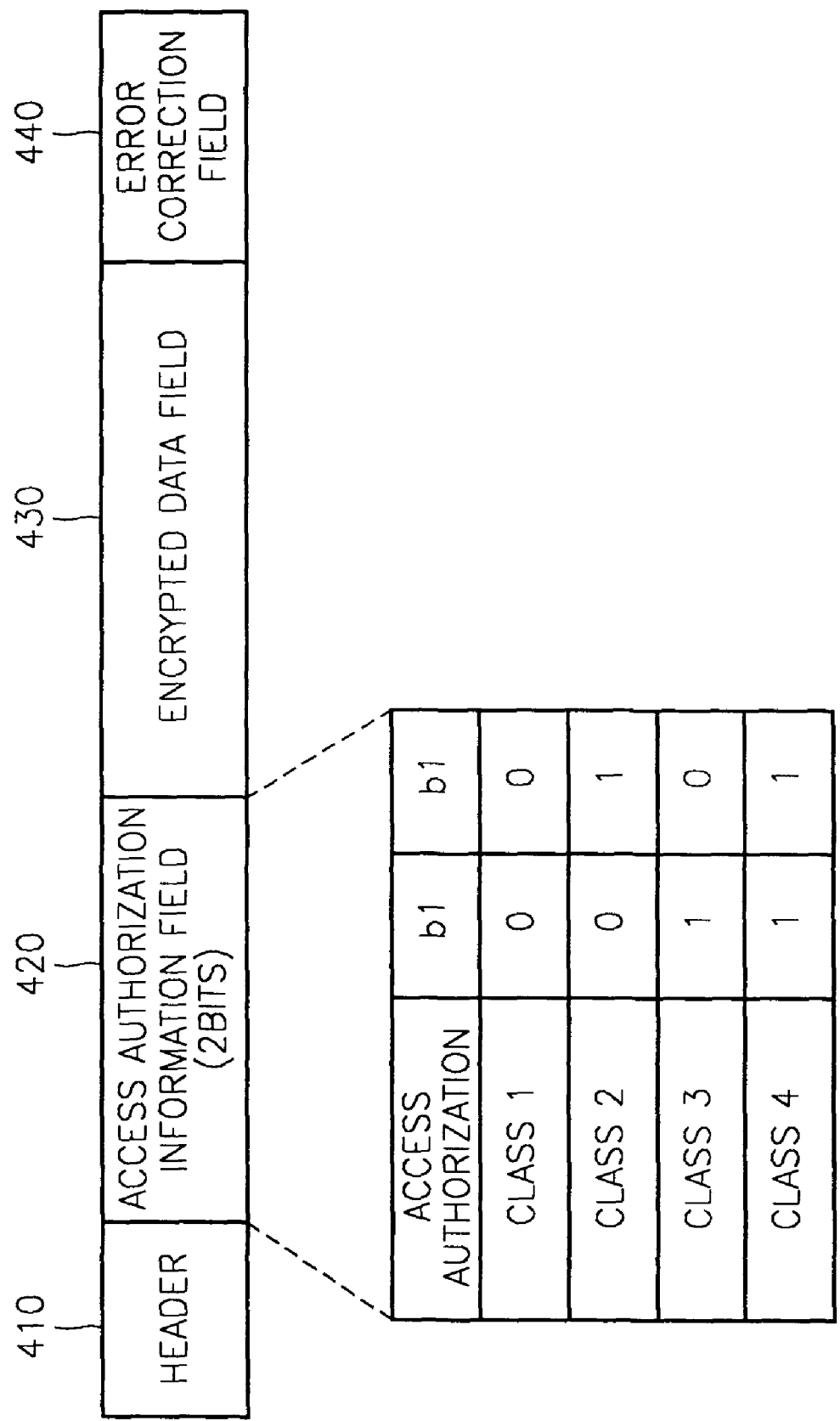
FIG. 4 is a diagram showing the structure of a packet header for encryption according to access authorization classes.

A method for secure fast roaming using encryption keys according to access authorization classes is shown in FIG. 2. After obtaining a shared key set SK in initial authentication, the STA encrypts data by using SK1 and communicates that data to an AP to which the STA is assigned. Turning now to FIG. 4, FIG. 4 illustrates a message format used in a method for expressing the access authorization in a header of transmission message packet communicated between STA and AP. When the STA switches to an AP of class 2, the STA should use SK2 for encrypting data. Likewise, when the STA communicates with an AP of class 3, the STA uses SK3, and when the STA communicates with an AP of class 4, the STA encrypts data by using SK4. The method for expressing access authorizations of a header is shown in FIG. 4.

FIG. 4 illustrates the structure of a packet header for encryption according to access authorization classes, that packet is transmitted and received through a wireless transmission network, it comprises a header 410, an access authorization information field 420, an encrypted data field 430, and an error correction field 440. Accordingly, by allocating two bits in the packet access authorization information field 420 for storing access authorization information, four classes can be expressed by the possible combinations of the two bits. For example, "00", "01", "10", and "11" may indicate class 1, 2, 3, and 4, respectively.

Figure 5:
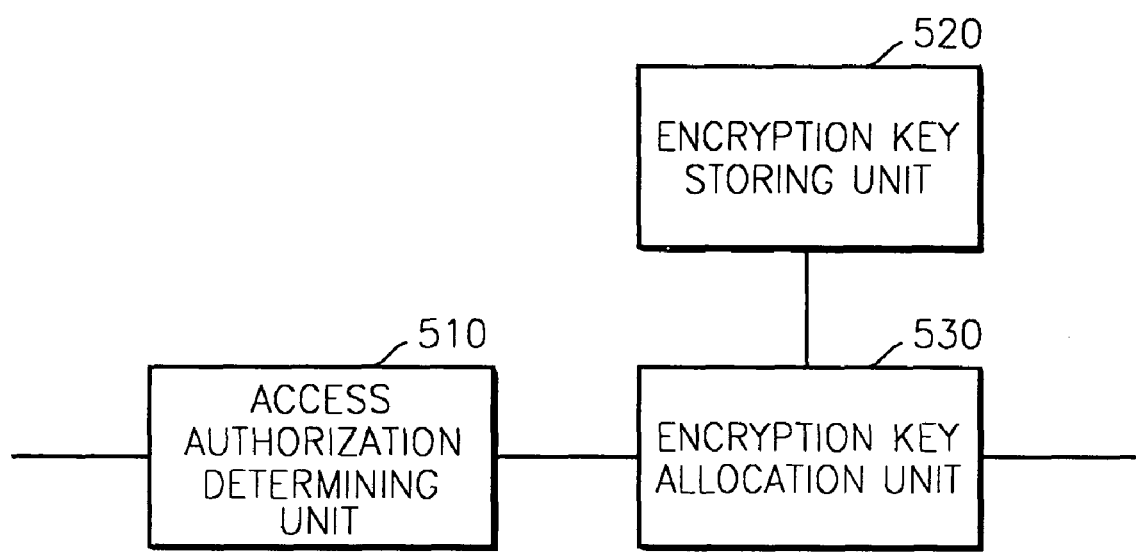
FIG. 5 is a block diagram of an apparatus for allocating encryption keys according to access authorization classes.

FIG. 5 illustrates an apparatus for allocating encryption keys according to access authorization classes comprises an access authorization determining unit 510, an encryption key storing unit 520, and an encryption key allocation unit 530. The access authorization determining unit 510 determines the access authorization class attributed to communication between an STA and an AP. The types of classes include class 1 that indicates access authorization to an AP to which the STA is assigned, class 2 that indicates access authorization to predetermined APs included in a LAN to which the STA is assigned, class 3 that indicates access authorization to all APs included in the LAN to which the STA is assigned, and class 4 that indicates access authorization to multiple APs included in the WAN.

If an STA requests authentication to an AP, the access authorization determining unit 510 determines the access authorization class of the STA. The encryption key storing unit 520 stores encryption keys according to the classes in advance. Based on the determination result of the access authorization determining unit 510, the encryption key allocation unit 530 reads the encryption key from the encryption key storing unit 520, and transfers the value to the STA.

The present invention may be embodied in machine code, which can be read by a computer, on a computer readable recording medium. The computer readable recording medium includes all kinds of recording apparatuses on which computer readable data is stored. The computer readable recording media includes but is not limited to storage media such as magnetic storage media, e.g., ROMs, floppy disks, hard disks, etc., optically readable media, e.g., CD-ROMs, DVDs, etc., memory, e.g., random access (RAM) and Flash, and carrier waves, e.g., transmissions over the Internet.

Optimum embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

As described above, the present invention describes encryption key differentiation according to access authorization classes and a fast secure roaming method using the keys. By doing so, the present invention reduces the delay time, which is caused by encryption key distribution while a wireless terminal is traveling, such that roaming and hand-off are carried out quickly and safely, and user convenience and safe transmission of data are achieved.

What is claimed:

1. A method for allocating a plurality of encryption keys differentiated according to a plurality of access authorization classes, the differentiated encryption keys provided to communicate data with corresponding access points, the method comprising:

requesting by a wireless station to an access point to perform initial authentication; and obtaining by the wireless station the differentiated encryption keys in advance when the initial authentication of the wireless station is performed.

2. The method of claim 1, wherein the access authorization classes comprise:

a class 1 that indicates access authorization to an access point to which the wireless station is assigned, a class 2 that indicates access authorization to predetermined access points included in a local area network (LAN) to which the wireless station is assigned, a class 3 that indicates access authorization to all access points included in the LAN to which the wireless station is assigned, and a class 4 that indicates access authorization to multiple access points included in a wide area network (WAN).

3. The method of claim 1, further comprising:

the wireless station desiring to communicate with an access point selecting from the differentiated encryption keys an encryption key corresponding to access authorization to the access point and communicates data with the access point.

4. The method of claim 1, wherein the obtaining of the differentiated encryption keys comprises:
   (a) determining access authorization to the access point when the access point is requested to perform initial authentication by the wireless station;
   (b) obtaining an encryption key and generating a shared key set including the obtained encryption keys in accordance with the determination result of step (a);
   (c) determining access authorization to an access point belonging to a LAN by a LAN authentication server which is requested to perform initial authentication by the wireless station;
   (d) obtaining an encryption key and updating the shared key set by adding the encryption key to the shared key set in accordance with the determination result of step (c);
   (e) determining access authorization to an access point belonging to a WAN by a WAN authentication server which is requested to perform initial authentication by the wireless station; and
   (f) obtaining an encryption key and updating the shared key set by adding the encryption key to the shared key set in accordance with the determination result of step (e).

5. The method of claim 4, wherein step (a) further comprises the wireless station requesting the access point to perform authentication, and the access point which is requested to perform authentication determining whether or not access authorization to the access point corresponds to a class 1, the class 1 indicating access authorization to the access point to which the wireless station is assigned.

6. The method of claim 4, wherein step (c) further comprises:
   (c1) the LAN authentication server determining whether or not access authorization to the access point corresponds to a class 2, the class 2 indicating access authorization to predetermined access points included in a LAN to which the wireless station is assigned;
   (c2) if a determination result of step (c1) indicates that the access authorization corresponds to the class 2, obtaining an encryption key of class 2, and determining whether or not the access authorization corresponds to a class 3, the class 3 indicating access authorization to all access points included in the LAN to which the wireless station is assigned; and
   (c3) if a determination result of step (c2) indicates that the access authorization corresponds to the class 3, obtaining an encryption key of class 3.

7. The method of claim 6, wherein step (c2) further comprises:
   allocating a null encryption key if the determination result of step (c1) indicates that the access authorization does not correspond to the class 2; and
   allocating a null encryption key if the determination result of step (c2) indicates that the access authorization does not correspond to the class 3.

8. A computer readable storage medium having embodied thereon a program of instructions executable by a computer for performing the method of claim 4.

9. The method of claim 1, wherein access authorization is allocated to each of a plurality of areas in a wireless network, each of the areas being classified according to mobile characteristics of the wireless station including a roaming or a hand-off operation and is used for the wireless station to access an access point which exists in the classified area.

10. A roaming method for a wireless station using a plurality of encryption keys differentiated according to a plurality of access authorization classes, the differentiated encryption keys provided to communicate data with corresponding access points, the method comprising:
    (a) obtaining by a wireless station in advance an encryption key set including the differentiated encryption keys for the corresponding access points when initial authentication of the wireless station is performed;
    (b) receiving a command to communicate with an access point not available for communication using an encryption key currently selected in the encryption key set;
    (c) determining an access authorization to the access point not available for communications;
    (d) selecting an encryption key from the encryption key set obtained in advance corresponding to the determined access authorization; and
    (e) using the selected encryption key to encrypt data and communicate with the access point not available for communication.

11. The method of claim 10, wherein the access authorization classes comprise:
    a class 1 that indicates access authorization to an access point to which the wireless station is assigned,
    a class 2 that indicates access authorization to predetermined access points included in a local area network (LAN) to which the wireless station is assigned,
    a class 3 that indicates access authorization to all access points included in the LAN to which the wireless station is assigned, and
    a class 4 that indicates access authorization to multiple access points included in a wide area network (WAN).

12. A computer readable storage medium having embodied thereon a program of instructions executable by a computer for the method of claim 10.

13. The method of claim 10, wherein access authorization is allocated to each of a plurality of areas in a wireless network, each of the areas being classified according to mobile characteristics of the wireless station including a roaming or a hand-off operation and is used for the wireless station to access an access point which exists in the classified area.

14. An apparatus for allocating a plurality of encryption keys differentiated according to a plurality of access authorization classes, the differentiated encryption keys provided to communicate data with corresponding access points, the apparatus comprising:
    an access authorization determining unit for determining an access authorization class for communication between a wireless station and an access point;
    an encryption key storing unit which stores the differentiated encryption keys; and
    an encryption key allocation unit which reads an encryption key from the encryption key storing unit corresponding to a determination result of the access authorization determining unit and transfers a value of the encryption key to the wireless station in advance of an initial authentication of the wireless station by the access point.

15. The apparatus of claim 14, wherein the access authorization classes comprise:
    a class 1 that indicates access authorization to an access point to which the wireless station is assigned,
    a class 2 that indicates access authorization to predetermined access points included in a local area network (LAN) to which the wireless station is assigned, a class 3 that indicates access authorization to all access points included in the LAN to which the wireless station is assigned, and a class 4 that indicates access authorization to multiple access points included in a wide area network (WAN).

16. The apparatus of claim 14, wherein access authorization is allocated to each of a plurality of areas in a wireless network, each of the areas being classified according to mobile characteristics of the wireless station including a roaming or a hand-off operation and is used for the wireless station to access an access point which exists in the classified area.

17. A computer readable storage medium storing instructions which, when executed causes execution of a program implementing a structure of a wireless data packet in a wireless network that comprises a wireless station and an access point, the structure comprising:

a header of said data packet transmitted through the wireless network;

an access authorization information storing field, which indicates access authorization for communication between the wireless station and the access point, wherein:

the access authorization information storing field comprises access authorization information being used for allocating encryption keys differentiated according to access authorization classes, and the differentiated encryption keys are provided to the wireless station in advance of an initial authentication by the access point;

an encrypted data field in which data contents to be transmitted are encrypted and stored; and an error correction field, which is used to correct data error.

18. The computer readable storage medium of claim 17, wherein the access authorization information storing field comprises two bits and through possible combinations of the two bits, stores a class 1 that indicates access authorization to an access point to which the wireless station is assigned, a class 2 that indicates access authorization to predetermined access points included in a local area network (LAN) to which the wireless station is assigned, a class 3 that indicates access authorization to all access points included in the LAN to which the wireless station is assigned, and a class 4 that indicates access authorization to multiple access points included in a wide area network (WAN).

19. The computer readable storage medium of claim 17, wherein access authorization is allocated to each of a plurality of areas in a wireless network, each of the areas being classified according to mobile characteristics of the wireless station including a roaming or a hand-off operation and is used for the wireless station to access an access point which exists in the classified area.

* * * * *